(12) United States Patent
Wildemann et al.

(10) Patent No.: US 12,198,480 B2
(45) Date of Patent: Jan. 14, 2025

(54) USING SOUND TO DETECT VEHICLE BODY ANOMALIES

(71) Applicant: Robert Bosch GmbH, Stuttgart (DE)

(72) Inventors: Soeren Wildemann, Novi, MI (US); Jonathan J. Macoskey, Pittsburgh, PA (US)

(73) Assignee: Robert Bosch GmbH (DE)

( * ) Notice: Subject to any disclaimer, the term of this patent is extended or adjusted under 35 U.S.C. 154(b) by 1075 days.

(21) Appl. No.: 17/037,843

(22) Filed: Sep. 30, 2020

(65) Prior Publication Data

US 2022/0101661 A1    Mar. 31, 2022

(51) Int. Cl.
*G07C 5/08* (2006.01)
*G01N 29/07* (2006.01)
*G01N 29/12* (2006.01)
*G01N 29/34* (2006.01)
(Continued)

(52) U.S. Cl.
CPC ........... *G07C 5/0808* (2013.01); *G01N 29/07* (2013.01); *G01N 29/12* (2013.01); *G01N 29/348* (2013.01); *G01S 19/01* (2013.01); *G07C 5/006* (2013.01); *G01N 2291/011* (2013.01);
(Continued)

(58) Field of Classification Search
CPC ...... G07C 5/0808; G07C 5/006; G01N 29/07; G01N 29/12; G01N 29/348; G01N 2291/011; G01N 2291/023; G01N 2291/0289; G01N 2291/044; G01N 2291/10; G01N 2291/012; G01N 29/043; G01N 29/11; G01N 2291/0258; G01N 2291/102; G01N 29/4436; G01N 29/4454; G01S 19/01
See application file for complete search history.

(56) References Cited

U.S. PATENT DOCUMENTS

| | | | |
|---|---|---|---|
| 10,540,833 B1 * | 1/2020 | Gingrich | G06Q 40/08 |
| 2017/0293895 A1 * | 10/2017 | Song | G06Q 10/20 |
| 2021/0179021 A1 * | 6/2021 | Battlogg | G08B 13/19695 |

FOREIGN PATENT DOCUMENTS

| | | |
|---|---|---|
| CN | 110033608 A | 7/2019 |
| KR | 19980053594 U | 10/1998 |

OTHER PUBLICATIONS

Hijazi, Ultrasonic Testing, 2013 (Year: 2013).*
(Continued)

*Primary Examiner* — Alan D Hutchinson
(74) *Attorney, Agent, or Firm* — Dickinson Wright PLLC (57) ABSTRACT

A system for detecting vehicle body damage is disclosed. One or more ultrasonic transceivers are installed on a portion of the vehicle body and configured to transmit and receive ultrasonic sound waves. One or more controllers are coupled to the one or more ultrasonic transceivers. The one or more controllers are programmed to cause the ultrasonic transceiver to emit first ultrasonic sound waves and receive first reflected ultrasonic sound waves, store in memory first sound signature data relating to the first reflected ultrasonic sound waves, cause the ultrasonic transceiver to emit second ultrasonic sound waves and receive second ultrasonic sound waves, and determine a presence of damage on the portion of the vehicle body based on second sound signature data relating to the second reflected ultrasonic sound waves deviating from the first sound signature data.

18 Claims, 4 Drawing Sheets

(51) Int. Cl.
*G01S 19/01* (2010.01)
*G07C 5/00* (2006.01)

(52) U.S. Cl.
CPC ............... *G01N 2291/023* (2013.01); *G01N 2291/0289* (2013.01); *G01N 2291/044* (2013.01); *G01N 2291/10* (2013.01)

(56) References Cited

OTHER PUBLICATIONS

Torres-Arredondo, M. A., Julián Sierra-Pérez, and Guénaël Cabanes. "An optimal baseline selection methodology for data-driven damage detection and temperature compensation in acousto-ultrasonics." Smart Materials and Structures 25.5 (2016): 055034. (Year: 2016).*

* cited by examiner

FIG. 5

USING SOUND TO DETECT VEHICLE BODY ANOMALIES

TECHNICAL FIELD

The present disclosure relates to using sound to detect vehicle body anomalies.

BACKGROUND

Vehicles are susceptible to body damage. Dents, dings, and scratches in vehicles is very commonplace, whether it be from contacting another vehicle on the road, or even as small as accidentally bumping into an object while trying to park. Owners of fleets of vehicles, such as car rental companies, autonomous taxi services, and the like are certainly aware of damage that can be done to their vehicles. As many different people rent or temporarily use these vehicles, it may be hard for the fleet vehicle's owner to determine which of the persons caused the damage to the vehicle. The owner of the vehicle may like to know and understand when the damage to the vehicle occurred, and who is responsible for the damage.

SUMMARY

In one embodiment, a system for detecting damage on a vehicle body comprises an ultrasonic transceiver installed on a portion of the vehicle body and configured to transmit and receive ultrasonic sound waves. The system also comprises one or more controllers coupled to the ultrasonic transceiver and programmed to (i) cause the ultrasonic transceiver to emit first ultrasonic sound waves and receive first reflected ultrasonic sound waves, (ii) store, in memory, first sound signature data relating to the first reflected ultrasonic sound waves, (iii) cause the ultrasonic transceiver to emit second ultrasonic sound waves and receive second ultrasonic sound waves, and (iv) determine a presence of damage on the portion of the vehicle body based on second sound signature data relating to the second reflected ultrasonic sound waves deviating from the first sound signature data.

In one embodiment, a method for suing sound to detect vehicle body damage is provided. The method includes (i) via one or more transceivers onboard a vehicle, sending first ultrasonic sound waves across a portion of the vehicle, (ii) via the one or more transceivers, receiving first reflected ultrasonic sound waves as a result of the first ultrasonic sound waves reflecting off a surface back to the one or more transceivers, (iii) storing first sound signature data relating to characteristics of the first reflected ultrasonic sound waves in a non-volatile memory of the vehicle, (iv) via the one or more transceivers, sending second ultrasonic sound waves across the portion of a vehicle body, (v) via the one or more transceivers, receiving second reflected ultrasonic sound waves as a result of the second ultrasonic sound waves reflecting off a surface back to one or more the transceivers, (vi) determining second sound signature data relating to characteristics of the second reflected ultrasonic sound waves, and (vii) detecting damage in the portion of the vehicle based on the second sound signature data deviating from the first sound signature data.

In one embodiment, a tangible, non-transitory computer storage medium having computer readable instructions stored thereon is provided. The tangible, non-transitory computer storage medium, when executed by one or more processors, performs the following: (i) via one or more transceivers mounted to a portion of a vehicle, sending and receiving a plurality of first ultrasonic sound waves across the portion of the vehicle, (ii) determining a plurality of first sound signatures relating to characteristics of the sent and received plurality of first ultrasonic sound waves to establish a baseline sound signature, (iii) sending and receiving a second ultrasonic sound wave across the portion of a vehicle, (iv) determining second sound signature relating to characteristics of the sent and received second ultrasonic sound wave, and (v) outputting an electronic notification indicating damage on the portion of the vehicle in response to the second sound signature deviating from the baseline sound signature.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Owners of vehicles are interested in understanding cause and relationship of damages to their vehicle. This is particularly true for owners or managers of fleets of vehicles, such as mobility providers, vehicle rental entities, autonomous taxi services, and the like. The owner of the vehicle may like to know and understand when the damage to the vehicle occurred, and who is responsible for the damage. Knowing that a damage took place changes insurance liability and cost of ownership. Current mobility service providers suffer from a high degree of damage to their vehicles by users. Not only could the repair costs of a dented vehicle be high, but it may pose a safety risk for all passengers. Moreover, a dented vehicle does not look welcoming.

A manual, visual analysis of the vehicle, once returned to the owner, may make the damage to the vehicle evident.

However, it may be hard to prove that the last operator was the actual individual that caused the damage. Owners of vehicle fleets typically carry the burden to prove that a certain operator was at fault; if unsuccessful, the owner must pay to repair the damages.

Therefore, according to various embodiments described herein, a system for using sound to detect vehicle body anomalies is provided. The system may include transceivers configured to emit a sound wave. The sound wave is reflected back to the transceiver. Under normal conditions, the profile of the reflected sound wave matches that which is stored in memory as "normal," and thus there is no detected damage or anomaly. However, if damage is done to the vehicle within range of the transceiver, then the reflected sound wave may change in characteristics such that the reflected sound wave does not match that which is stored in memory. If so, an associated controller interprets this discrepancy as a detected damage or anomaly (e.g., dent, ding, scratch). The owner or manager of the vehicle can be alerted of such damage.

Figure 1:
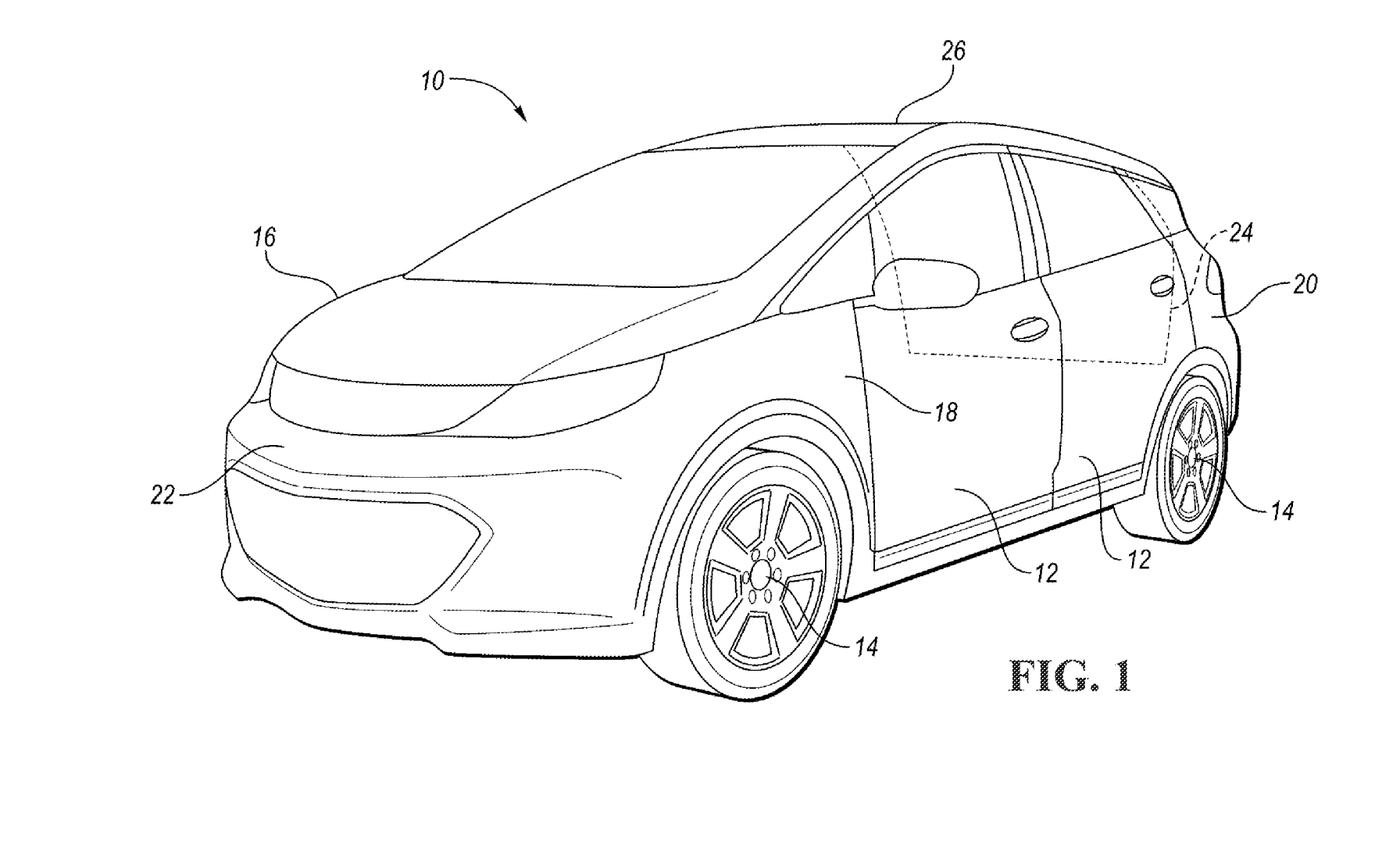
FIG. 1 is a perspective view of a vehicle capable of employing a system for using sound to detect vehicle body anomalies, according to one embodiment.

FIG. 1 illustrates a vehicle 10 that can employ such a system 11 for using sound to detect vehicle body anomalies. The vehicle 10 may be any type of passenger vehicle, such as a car, van, truck, sports utility vehicle (SUV), or the like. The illustrated vehicle 10 includes several door panels 12, wheels 14, a hood 16, front fenders 18, rear fenders 20, front and rear bumpers 22, a trunk 24, and a roof 26. Each of these locations of the vehicle 10 are susceptible to damage or anomalies (e.g., dents, dings, scratches, etc.) from impact with an external object. As will be described below, one or more of these vehicle regions can be equipped with a sensor or transceiver configured to emit a sound wave to that region, and a controller can analyze the reflected sound wave by comparing it to stored sound wave profiles. Based on the analysis of the reflected sound wave, the controller may determine whether such damage or anomaly exists on that vehicle region.

Figure 2:
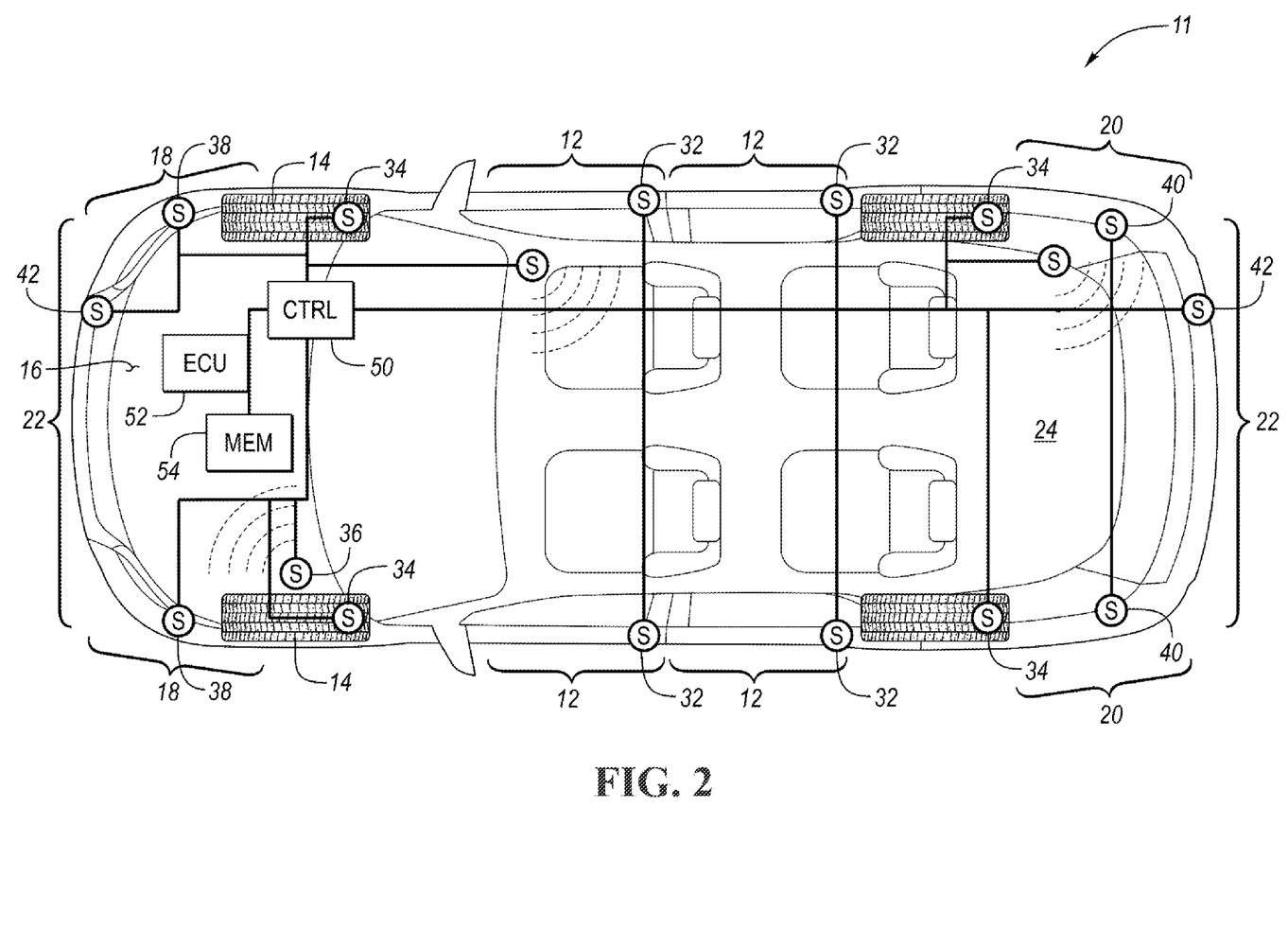
FIG. 2 is an overhead schematic view of a vehicle having a system for using sound to detect vehicle body anomalies, according to an embodiment.
Figure 3:
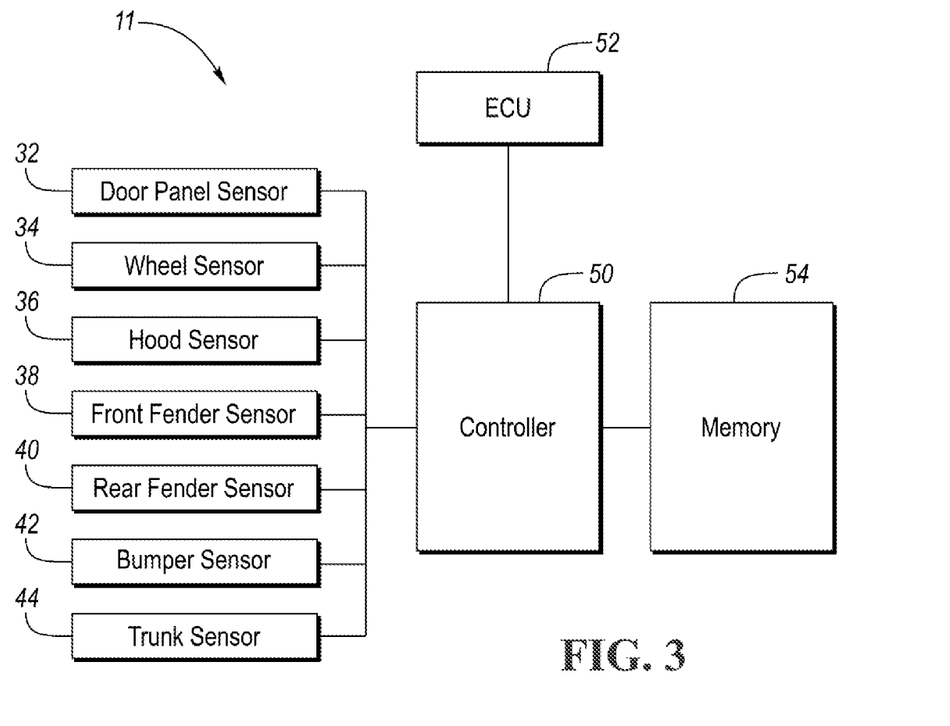
FIG. 3 is a schematic flowchart of a system for using sound to detect vehicle body anomalies, according to an embodiment.

FIG. 2 illustrates a schematic of the system 11 for using sound to detect vehicle body anomalies, according to an embodiment. FIG. 3 illustrates a flow diagram of the various hardware in the system 11, according to an embodiment. Referring to FIGS. 2-3, the system 11 includes various sensors disposed about the vehicle 10. The various sensors can include one or more of a door panel sensor 32 disposed on one or more of the door panels 12, one or more wheel sensors 34 disposed on one or more of the wheels 13, one or more hood sensors 36 disposed on the hood 16, one or more front fender sensors 38 disposed on one or more of the front fenders 18, one or more rear fender sensors 40 disposed on one or more of the rear fenders 20, one or more bumper sensors 42 disposed on either or both of the rear or front bumpers 22, one or more trunk sensors 44 disposed on or in the trunk, and one or more roof sensors 46 disposed on the vehicle roof. These sensors 32-46 may be disposed in, on, or adjacent the associated vehicle part that is being sensed for anomalies. These sensors 32-46 may be configured to emit a sound wave, and receive a reflected sound wave off of a dent or anomaly on the associated vehicle part on which the sensor is located. The sensors 32-46 may therefore be referred to as transceivers. The sensors or transceivers 32-46 can be placed on the desired vehicle body part, perpendicular or oblique relative to the plane of the body part to which it attaches, such that the sending/receiving of sound waves is directed across the vehicle body, and not directly perpendicular to the body. In one embodiment, the sensors or transceivers 32-46 can be placed on an edge of a vehicle body part such that its emitted sound waves travel toward or along the length of the body part. This orientation maximizes the scanning area available for the transceivers 32-46, and does not limit the transceivers 32-46 from only sending/receiving sound waves in a region directly into the underlying body.

The transceivers 32-46 are configured to both transmit and receive sound waves or signals indicative of sound waves. The transceivers each have a wireless (or wired) transmitter to transmit the sound waves or associated signals, and a receiver to receive reflected sound waves or associated signals. Of course, in other embodiments, the transceivers can be replaced by a separate transmitter and receiver. The transceivers can be connected to a controller (described below) for processing data received by receiver portion of the transceivers 32-46, and comparing the received data to that which is stored in memory 54 (described below). The electrical connection between the transceivers 32-46, controller 50, ECU 52, and Memory 54 can be made via a CAN bus (controller area network bus). In another embodiment, the transceivers 32-46 can be connected to the controller via Ethernet, USB, or other modern networks. Also, each transceiver 32-46 can be connected to its own designated controller to send a damage yes/no signal, and if so, a CAN bus can be utilized for the connections.

The transceivers can also be connected to an off-board controller and/or memory for performing such functions. For example, in the case of fleet management, it may be advantageous to monitor the status of the vehicle body (and any dents or anomalies thereon) remotely. Therefore, the transceivers 32-46 can transmit data representing the received sound characteristics of the reflected sound waves, the sound characteristics stored on memory, and/or the processing and comparison of such data that would indicate the presence of damage on the vehicle body. The transceivers can be configured to transmit such data via a cellular network, a wireless local area network ("Wi-Fi"), a personal area network, and/or any other wireless network. Accordingly, one or more of the transceivers 32-46 can be compatible with one or more desired wireless communication standard or protocol including, but not limited to, Near Field Communication ("NFC"), IEEE 802.11, IEEE 802.15.1 (BLUETOOTH), Global System for Mobiles ("GMS"), Code Division Multiple Access ("CDMA"), and the like.

The system 11 can also include both a controller (CTRL) 50 and an electronic control unit (ECU) 52. These devices are shown as two separate units, but in other embodiments the function and structure of the two devices is found in a single device. In one embodiment, the controller receives and processes signals from the various transceivers about the vehicle body, and performs functions associated with operating the system for using sound to detect vehicle body anomalies, while the ECU performs higher level vehicular commands, such as communicating with an engine control unit, a transmission control unit, and the like. Therefore, both the ECU and the controller may both be generally referred to as a controller, and can be any controller capable of receiving information from the receiver portion of the vehicle body transceivers, processing the information, and outputting instructions to provide a notification of damage or anomaly based on the received signals from the receiver portions, for example. In this disclosure, the terms "controller" and "system" may refer to, be part of, or include processor hardware (shared, dedicated, or group) that executes code and memory hardware (shared, dedicated, or group) that stores code executed by the processor hardware. The code is configured to provide the features of the controller and systems described herein. In one example, the controller may include a processor, memory, and non-volatile storage. The processor may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory (MEM) 54, coupled to the controller.

The memory 54 may include a single memory device or a plurality of memory devices including, but not limited to, random access memory ("RAM"), volatile memory, non-volatile memory, static random-access memory ("SRAM"), dynamic random-access memory ("DRAM"), flash memory, cache memory, or any other device capable of storing information. The non-volatile storage may include one or more persistent data storage devices such as a hard drive, optical drive, tape drive, non-volatile solid-state device, or any other device capable of persistently storing information. The processor may be configured to read into memory and execute computer-executable instructions embodying one or more software programs residing in the non-volatile storage. Programs residing in the non-volatile storage may include or be part of an operating system or an application, and may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL. The computer-executable instructions of the programs may be configured, upon execution by the processor, to output a notification or signal that there is damage or an anomaly on the vehicle body in response to the characteristics of the sound signals received by the various vehicle body transceivers, for example.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

A computer program (also known as a program, software, software application, script, or code) can be written in any form of programming language, including compiled languages, interpreted languages, declarative languages, and procedural languages, and the computer program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, libraries, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a field programmable gate array ("FPGA") or an application specific integrated circuit ("ASIC"). Such a special purpose circuit may be referred to as a computer processor even if it is not a general-purpose processor.

As illustrated in the embodiments of FIGS. 2-3, the transceivers 32-44 are coupled to the controller 50. The controller 50 can be programmed to activate the transceivers 32-44 at set time intervals, or in response to certain triggers. These triggers can be provided by the connected ECU 52. For example, in one embodiment, the controller 50 activates the transceivers 32-44 to emit sound waves and receive the reflected sound waves in response to safety or force sensors (e.g., impact sensors) from the vehicle's safety system indicating the potential of an impact or vehicle accident, as provided from the ECU 52 to the controller 50. In another embodiment, the controller 50 activates the transceivers 32-44 in response to the vehicle being turned ON or OFF, as indicated from the ECU 52 for example. In another embodiment, the controller 50 activates the transceivers 32-44 in response to the vehicle being placed in PARK. These are merely examples of when the controller 50 can be programmed to activate the transceivers 32-44. Of course, in other embodiments, the transceivers 32-44 are continuously emitting and receiving the sound waves when the vehicle is on.

Figure 4:
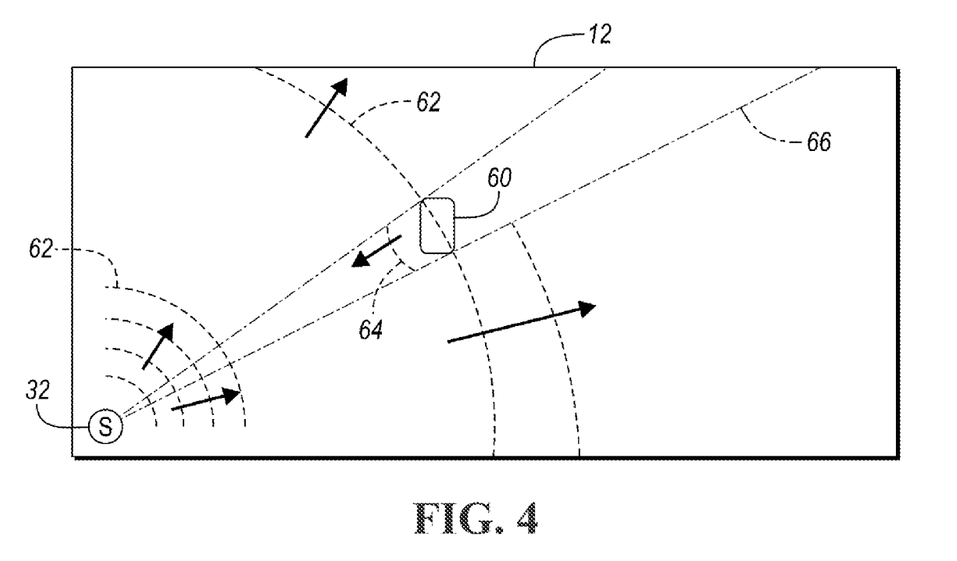
FIG. 4 is a schematic representation of operation of transceivers configured to send and receive sound to detect vehicle body anomalies, according to an embodiment.

FIG. 4 illustrates a schematic representation of operation of the transceivers. Operation of the door sensor 32 on the door panel 12 is shown, but the teachings of this Figure can apply to any of the sensors or transceivers 32-44. The door panel 12 is provided with an anomaly 60, such as a dent, scratch, or other damage, as explained above. When activated by the controller 50, the transceiver 32 emits a sound wave 62. The sound wave 62 may be a singular or a burst of ultrasonic sound. The transmitted sound wave 62 travels radially outward from the transceiver 32.

The sound wave 62 is configured to pass through the material of interest and reflect off of any imperfections, void spaces, or other discontinuities. As shown, the sound wave 62 engages the anomaly 60, and reflects back toward the transceiver 32. In other words, the emitted sound wave 62 is converted into a reflected sound wave 64 upon reflecting off of the dent or scratch 60. The transceiver 32 then receives these reflected sound waves 64.

Data representing this activity can be stored in memory 54, both with and without an anomaly 60 present. For example, during normal operation and without an anomaly 60 in the vehicle panel, the transceiver 32 can emit sound waves 62. The transceiver 32 then receives a reflected sound wave as the sound wave 62 reflects off of the curvature of the vehicle panel, or other purposefully designed structure of the vehicle. The characteristics and profiles (also referred to as the sound signature) of the received sound waves can be stored in memory 54. Examples of data representing the sound signature of the received sound wave can include the time between the transceiver emitting a sound wave 62 and receiving a reflected sound wave, the magnitude or amplitude of the reflected sound wave, the angle from which the reflected sound waves are received, the spectrum of the signal (i.e., the frequencies and polarity (phase) included in the signal), and the like.

Subsequently, when an anomaly 60 becomes present on the vehicle panel 12, the sound signature of the reflected sound wave will change due to the presence of the illustrated reflected sound wave 64. For example, the time between the transceiver emitting a sound wave 62 and receiving a reflected sound wave may now alter due to the presence of the reflected sound wave 64. The reflected sound wave 64 may also be different in amplitude. The angle of arrival of the reflected sound wave 64 may also be different. For example, based on the size of the reflected sound wave 64, the controller 50 may be programmed to determine an angle 66 of the sound anomaly. Within a given material, ultrasound can be reflected, refracted, transmitted, scattered, absorbed and/or blocked by changes relative to the surrounding material. A dent, scratch, and the like will change the properties of the panel so that the sound signature changes. Any of the above characteristics (reflected, refracted, transmitted, scattered, absorbed and/or blocked) can change by the presence of such a dent or scratch.

The sound signatures of the reflected sound waves after the vehicle panel 12 is subject to an anomaly 60 will then also be stored in memory 54. The controller 50 is programmed to compare the sound signature of the reflected sound waves over time, and thus can determine when an anomaly 60 is present by determining a difference in the characteristics and profiles of the reflected sound waves. In other words, the sound signature of reflected sound waves stored in memory may all generally be the same during normal operation, but when an anomaly 60 is present, there may be a stark difference in at least a portion of the reflected sound waves due to the presence of reflected sound wave 64. Thus, the controller determines a difference between the sound signature of a current reflected sound wave and the sound signature of one or more previous reflected sound waves. This indicates a presence of an anomaly 60.

The controller 50 can be programmed to flag this difference in the memory 54. For example, when such a difference in the sound signature of the reflected sound waves is determined by the controller 50, the controller can cause the memory 54 to store a date, time, angle or location of the anomaly 60 based on the sound signature of the reflected sound waves, and/or magnitude of difference between the sound signature of the current reflected sound wave and the sound signatures of previous reflected sound waves which may indicate the severity of the anomaly 60. The controller 50 can also access the vehicle's global position system (GPS) and store locational information into the memory 54 so that the location of the vehicle during the time of the detected anomaly 60 can be logged and recalled. This may help enrich information that is accessible by a vehicle fleet owner, for example, if the vehicle is being leased or temporarily provided to a driver.

The system 11 can be initialized to scan the vehicle for potential damage in response to several triggers. In one embodiment, the system 11 can be utilized in conjunction with the vehicle's safety system. Damage, or the potential of an impact event, can be detected through other vehicle sensors such as accelerometers. The presence of a detected potential impact event can trigger the system 11 to wake the sensors 32-46 to perform a scan on all associated regions of the vehicle. If the vehicle is part of a fleet (e.g., rental vehicle), then the system 11 can be triggered to wake the sensors 32-46 to perform a scan when the vehicle is returned to the fleet. Similarly, if the vehicle is part of a fleet, the system 11 can be preprogrammed to have the sensors 32-46 perform a scan at regular intervals (e.g., every minute).

In embodiments, the controller 50 may be programmed to cause the transceivers 32-46 to emit sound at different frequencies in order to measure distinctive sound signatures per part. For example, the door sensor 32 may be configured to emit a sound at a first frequency, the wheel sensor 34 may be configured to emit a sound at a second frequency different than the first frequency, and so on. This allows the associated sensor to decipher the sound signature of each part of the vehicle.

This also allows the various transceivers 32-46 to cooperate in measuring the sound signatures across the vehicle. For example, the door sensor 32 may emit sound waves of a first frequency that is unique to the other emitted sound waves of the other sensors. The reflected sound waves will be received by one or more of the various sensors 32-46. Each of the one or more sensors 32-46 can thus determine that the received sound wave was emitted from the door sensor 32, and thus each of the one or more sensor 32-46 can detect a sound signature unique to the sound emitted by the door sensor 32. If an anomaly becomes present on the door panel for example, then the sound signature received by the one or more sensors 32-46 may be altered. The use of multiple sensors to receive a unique sound signature can help to confirm a difference in the sound signature, and thus confirm the presence of an anomaly 60.

While one controller 50 is illustrated, in other embodiments each sensor 32-46 is coupled to its own respective controller for the purpose of analysis and comparison between the previously recorded sound signatures stored in memory 54 with the newly received sound signature. In another embodiment, each sensor 32-46 is coupled to its own respective controller for the purpose of analysis of the sound signature, and then the main controller 50 compares the computed sound signatures with previously recorded sound signatures stored in memory 54.

Measuring angle, time delay, and/or other physical characteristics explicitly could be difficult, or could be hard to scale appropriately. Therefore, the system 11 can also utilize a statistical machine learning (ML) approach. In one embodiment, pair of transmitted and received signal spectrum (e.g., time-frequency maps) can be used as input, and fault vs. no-fault can be the output to the ML algorithm. A convolutional neural network could be used to perform this task. This ML-based approach could be used as a complementary solution together with classical approaches, e.g., measuring the physics-based reflection signal parameters as described herein.

The ML system may first be trained to learn sound signatures that represent dents or scratches. In one embodiment, the processor and memory associated with the ML system can analyze a plurality of sound signatures associated with human-confirmed dents or scratches, and a plurality of sound signatures associated with normally-appearing body (i.e., no dents or scratches). The results of this training and the associated data can be stored in metadata. In other words, the metadata may include data of many different sound signatures. The associated ML controller can access the metadata and compare a current sound signature with those stored in metadata. Based on a match in sound signature stored in the metadata of the ML system, the controller may deduce a scratch or dent is present.

Generally, the ML model may be trained to learn a function that provides a precise correlation between input values and output values. At runtime, a machine learning engine uses the knowledge encoded in the ML model against observed real-time data (e.g., a change in the sound signature due to a scratch or dent) to derive conclusions, such as a diagnosis or a prediction that a dent or scratch is present. One example of a machine learning system may include the TensorFlow AI engine made available by Alphabet Inc. of Mountain View, CA, and/or Random Forest, although other machine learning systems may additionally or alternately be used. In the examples described herein, the ML model is a vehicle body anomaly learning model.

Figure 5:
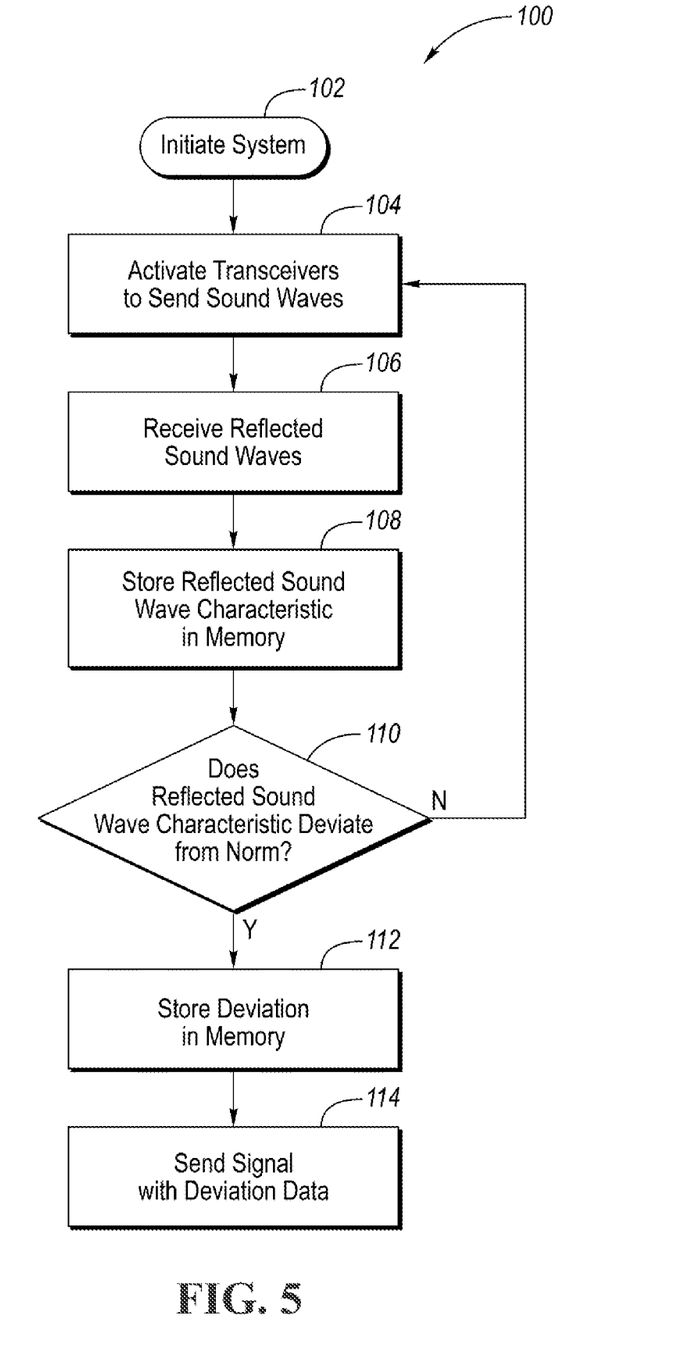
FIG. 5 is a flowchart of an algorithm for using sound to detect vehicle body anomalies, according to an embodiment.

FIG. 5 illustrates an exemplary flowchart of an algorithm 100 performed by the controller 50, according to an embodiment. At 102, the system is initiated or woken up. This may be performed by the controller 50, or the ECU 52. This may be in response to the vehicle turning on via a KEY-ON signal, or turning off via a KEY-OFF signal, for example, in which a physical or electronic key has been used to turn the vehicle on or off. This may also be performed in response to a connectivity unit (CCU) used by the fleet operator, a manual scan at the fleet station (e.g., rental return center), via mobile application of the fleet operator or mobility service provider, or via another sensor in the vehicle that detects a potential impact event such as an accelerometer or video camera.

At 104, the controller 50 activates the transceivers 32-46 to emit the ultrasonic sound waves, such as sound waves 62 for example. As explained above, the sound waves 62 travel radially outwardly, whereupon the reflection of those emitted sound waves is received by the transceivers 32-46 at 106. As explained above, each transceiver 32-46 may emit a sound wave of a unique frequency.

At 108, the reflected sound wave characteristics, or sound signature, is stored in memory 54. This can include, for example, the time between emitting and receiving the sound wave, the amplitude of the emitted and/or received sound wave, and other characteristics described above. This sound signature is stored in memory for later recall and comparison. The controller configures to send sound waves and receive reflected sound waves.

At 110, the controller receives a current reflected sound wave, and compares the sound signature of the current reflected sound wave to the sound signatures of the previous sound waves that are stored in memory 54. If the sound signature of the current sound wave deviates from the sound signatures stored in memory for that particular sensor, then the method proceeds to 112. A threshold may be set, such that small deviations are allowed and do not trigger a detected presence of an anomaly. For example, if the current sound signature only deviates from those saved in memory by 5% or less, no anomaly is detected and the method returns to step 104.

At 112, the deviation is stored in the memory 54. For example, a flag can be set, with a timestamp and a location of the detected anomaly. Other sound signature qualities described above can also be saved to memory 54 for later recall. Later, when the owner or controller of the vehicle or technician inspects the vehicle, they can access the stored data to see when and where the anomaly occurred.

At 114, the controller can cause a signal to be sent with the deviation data, or sound signature, or other type of notification that alerts the owner of a detected anomaly. For example, in one embodiment, one or more of the transceivers 32-46 or another transceiver on the vehicle 10 can wirelessly transmit a signal to a device of the owner along with information that alerts the owner that the vehicle has been damaged. In one embodiment, when the vehicle is returned to the owner or fleet manager after use, the owner or fleet manager can run a diagnostic of the vehicle, whereupon one or more of the transceivers can send the notification to the owner or fleet manager that the vehicle was damaged. In one embodiment, the owner can request to be presented with all damages that occurred between a first time (e.g., the time the customer started the rental) and a second time (e.g., the time the customer ended the rental). Information relating to the sound signature, such as the time of the damage, location of the vehicle during the damage, and severity of the damage based on the differences between the current and previously stored sound signatures, can be sent to the owner or fleet manager.

Referring back to FIGS. 1-4, it should be understood that the locations about the vehicle 10 for providing the sensors 32-46 are merely exemplary. In other embodiments, ultrasonic transceivers are placed in underbody parts, wheel wells, powertrain components, and other locations.

Moreover, the detected anomalies 60 may not necessarily be visible to the naked eye, and may be internal to the associated panel or part. For example, invisible blemishes can be in the form of fractures inside the part due to, for example, impacts. This may include cracks in a wheel's rim, cracks in the oil pan, and the like. The use of the system 11 of this disclosure can therefore provide more information to a vehicle owner than a simple visual inspection.

The system 11 may also be self-calibrating. For example, each time the vehicle is started, the system can be utilized to establish a baseline sound signature of the various locations about the vehicle. A new baseline can be set for each ride, so that for every new ride of the vehicle, a clear distinction of additional anomalies can be recorded. In one embodiment, the system detects an anomaly 60 according to the teachings above. This event is stored in memory. Then, after the vehicle has been turned off and back on again, the system can establish the sound signature as the new baseline sound signature. Any deviation from that sound signature can indicate the presence of a second anomaly.

The system 11 can also be used for impact detection even if no resulting anomaly is permanent on the vehicle. For example, the sensors 32-46 can be emitting ultrasonic soundwaves throughout a driving event. An impact may cause a temporary dent in the vehicle, which can be detected according to the methods above. But the impact may not be of a magnitude high enough to cause permanent damage. The system 11 would therefore detect a sound signature that deviates from normal, then returns to normal. This activity can also be logged in memory 54. A technician can then physically and manually inspect the region that was subject to the temporary damage to diagnose the region.

It is contemplated that temperature may play a role as to the characteristics of the reflected sound signature received by the sensors 32-46. Changes in temperature of the vehicle may alter the characteristics of the reflected sound waves. Therefore, the sensors 32-46 can be calibrated or the controller be configured to account for these temperature changes. For example, the system may communicate with a temperature sensor disposed on the vehicle. The system can be programmed to anticipate the sound signatures from the received sound waves at the sensors 32-46 to vary based on the detected temperature. The sensors 32-46 can be activated at different temperatures during operation of the vehicle so that it can build a profile or index of acceptable sound signatures at various temperatures. This would allow the system to more accurately classify sound signatures as either acceptable or unacceptable at the various temperatures. Otherwise, the changes in temperature might alter the characteristics of the vehicle body part to an extent that the controller might incorrectly deem a reflected or received sound signature as indicating potential damage, when in reality it is merely a change in temperature that is causing the change in sound signature.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A system for detecting damage on a vehicle body, the system comprising:
    an ultrasonic transceiver installed on a portion of the vehicle body and configured to transmit and receive ultrasonic sound waves; and
    one or more controllers coupled to the ultrasonic transceiver and programmed to:
        cause the ultrasonic transceiver to emit first ultrasonic sound waves and receive first reflected ultrasonic sound waves,
        store, in memory, first sound signature data relating to the first reflected ultrasonic sound waves,
        cause the ultrasonic transceiver to emit second ultrasonic sound waves and receive second ultrasonic sound waves in response to a signal provided from an electronic control unit (ECU) of the vehicle, wherein the signal provided from the ECU is sent in response to a KEY-ON or KEY-OFF event in the vehicle, and
        determine a presence of damage on the portion of the vehicle body based on second sound signature data relating to the second reflected ultrasonic sound waves deviating from the first sound signature data.

2. The system of claim 1, wherein the ultrasonic transceiver is a first ultrasonic transceiver, and the system includes a second ultrasonic transceiver installed on a second portion of the vehicle body and configured to transmit and receive ultrasonic sound waves.

3. The system of claim 2, wherein the one or more controllers further programmed to:
    cause the second ultrasonic transceiver to emit third ultrasonic sound waves and receive third reflected ultrasonic sound waves,
    store, in the memory, third sound signature data relating to the third reflected ultrasonic sound waves,
    cause the second ultrasonic transceiver to emit fourth ultrasonic sound waves and receive fourth reflected ultrasonic sound waves, and
    determine no presence of damage on the second portion of the vehicle body based on fourth sound signature data relating to the fourth reflected ultrasonic sound waves not deviating from the third sound signature data.

4. The system of claim 3, wherein the third and fourth ultrasonic sound waves are of a different frequency than the first and second ultrasonic sound waves.

5. The system of claim 1, wherein the one or more controllers is further programmed to cause a notification to be sent to an external device, wherein the notification alerts a user as to the damage on the portion of the vehicle body.

6. The system of claim 1, wherein the signal provided from the ECU is sent in response to impact sensors from a vehicle safety system indicating a potential of an impact or vehicle accident.

7. The system of claim 1, wherein the first sound signature data includes a time between the ultrasonic transceiver emitting the first ultrasonic sound waves and receiving the first reflected ultrasonic sound waves, and the second sound signature data includes a time between the ultrasonic transceiver emitting the second ultrasonic sound waves and receiving the second reflected ultrasonic sound waves.

8. The system of claim 1, wherein the one or more controllers is further programmed to store a timestamp in the memory in response to the determination of the presence of damage on the portion of the vehicle body.

9. The system of claim 1, wherein the one or more controllers is further programmed to access a global position system (GPS) of the vehicle and store a location of the vehicle in the memory in response to the determination of the presence of damage on the portion of the vehicle body.

10. A method for using sound to detect vehicle body damage, the method comprising:
    via one or more transceivers onboard a vehicle, sending first ultrasonic sound waves across a portion of the vehicle;
    via the one or more transceivers, receiving first reflected ultrasonic sound waves as a result of the first ultrasonic sound waves reflecting off a surface back to the one or more transceivers;

storing first sound signature data relating to characteristics of the first reflected ultrasonic sound waves in a non-volatile memory of the vehicle;

via the one or more transceivers, sending second ultrasonic sound waves across the portion of a vehicle body in response to a signal provided from an electronic control unit (ECU) of the vehicle, wherein the signal provided from the ECU is sent in response to a KEY-ON or KEY-OFF event in the vehicle;

via the one or more transceivers, receiving second reflected ultrasonic sound waves as a result of the second ultrasonic sound waves reflecting off a surface back to one or more the transceivers;

determining second sound signature data relating to characteristics of the second reflected ultrasonic sound waves; and detecting damage in the portion of the vehicle based on the second sound signature data deviating from the first sound signature data.

11. The method of claim 10, further comprising storing the second sound signature data in the non-volatile memory.

12. The method of claim 10, further comprising storing a timestamp in the non-volatile memory in response to the detecting of damage in the portion of the vehicle.

13. The method of claim 10, further comprising accessing a global position system (GPS) of the vehicle to obtain a location of the vehicle, and storing the location of the vehicle in the non-volatile memory in response to the detecting of damage in the portion of the vehicle.

14. The method of claim 10, further comprising sending a notification to an off-vehicle device indicating the detected damage in the portion of the vehicle.

15. The method of claim 10, wherein the one or more transceivers includes a plurality of transceivers, each configured to send respective ultrasonic sound waves at frequencies different than others of the plurality of transceivers.

16. A tangible, non-transitory computer storage medium having computer readable instructions stored thereon that, when executed by one or more processors, perform:

via one or more transceivers mounted to a portion of a vehicle, sending and receiving a plurality of first ultrasonic sound waves across the portion of the vehicle;

determining a plurality of first sound signatures relating to characteristics of the sent and received plurality of first ultrasonic sound waves to establish a baseline sound signature;

sending and receiving a second ultrasonic sound wave across the portion of a vehicle in response to a signal provided from an electronic control unit (ECU) of the vehicle, wherein the signal provided from the ECU is sent in response to a KEY-ON or KEY-OFF event in the vehicle;

determining second sound signature relating to characteristics of the sent and received second ultrasonic sound wave; and outputting an electronic notification indicating damage on the portion of the vehicle in response to the second sound signature deviating from the baseline sound signature.

17. The tangible, non-transitory computer storage medium of claim 16, wherein the computer readable instructions, when executed by the one or more processors, further performs:

outputting the electronic notification via a wireless transmission to a device of an owner or controller of the vehicle.

18. The tangible, non-transitory computer storage medium of claim 16, wherein the computer readable instructions, when executed by the one or more processors, further performs:

storing a timestamp in response to the second sound signature deviating from the baseline sound signature, enabling an owner or controller of the vehicle to later recall a time in which the damage on the portion of the vehicle occurred.

\* \* \* \* \*